(12) United States Patent
Krajnc et al.

(10) Patent No.: US 12,407,429 B2
(45) Date of Patent: Sep. 2, 2025

(54) DETERMINING CAUSE OF MISSING RF MESSAGES

(71) Applicant: SIGNIFY HOLDING B.V., Eindhoven (NL)

(72) Inventors: Hugo José Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 124 days.

(21) Appl. No.: 18/034,451

(22) PCT Filed: Oct. 20, 2021

(86) PCT No.: PCT/EP2021/079130
§ 371 (c)(1),
(2) Date: Apr. 28, 2023

(87) PCT Pub. No.: WO2022/090037
PCT Pub. Date: May 5, 2022

(65) Prior Publication Data
US 2024/0022340 A1    Jan. 18, 2024

Related U.S. Application Data

(60) Provisional application No. 63/107,632, filed on Oct. 30, 2020.

(30) Foreign Application Priority Data

Nov. 5, 2020   (EP) ..................................... 20205827

(51) Int. Cl.
*H04B 17/20* (2015.01)
(52) U.S. Cl.
CPC .................................. *H04B 17/204* (2023.05)

(58) Field of Classification Search
CPC ........ H04B 17/21; H04B 17/24; H04B 17/29; H04B 5/70; H04B 5/22; H04B 5/79;
(Continued)

(56) References Cited

U.S. PATENT DOCUMENTS

| 10,051,414 | B1 | 8/2018 | Omer et al. |
| 2001/0011954 | A1* | 8/2001 | Shelton .................... G01S 5/06 340/12.23 |

(Continued)

FOREIGN PATENT DOCUMENTS

| EP | 2214032 A1 | 8/2010 |
| WO | 2020035429 A1 | 2/2020 |

(Continued)

OTHER PUBLICATIONS

Soltanaghaei, Elahe, et al., "Peripheral Wifi Vision: Exploiting Multipath Reflections for More Sensitive Human Sensing," WPA '17, Niagara Falls, NY, DOI: http://dx.doi.org/10.1145/3092305.3092308, 2017 (6 Pages).

(Continued)

*Primary Examiner* — Ajibola A Akinyemi

(57) ABSTRACT

The present invention relates to operating an RF system (100) comprising multiple nodes (26, 28, 30) for transmitting and/or receiving RF messages (34). RF messages transmitted by a transmitting node (26) are received at receiving nodes (28, 30). It is determined whether the RF messages were completely received. Upon missing at least part of the RF messages at the receiving nodes, it is determined whether missing of at least part of the RF messages is caused by an activity event of a tangible entity (32) in transmission paths (40) between the transmitting node and the receiving nodes based on one or more RF system criteria. The RF messages (34) may include RF-based sensing messages (36) and RF data messages (38). A discrepancy between missed parts of the RF-based sensing messages and missed parts of the RF (Continued)

data messages may be determined and included in the RF system criteria.

11 Claims, 4 Drawing Sheets

(58) Field of Classification Search
CPC .... H04B 1/10; H04B 10/1149; H04B 10/116; H04B 10/25756; H04B 17/204; H04B 7/1858; H04B 7/18591
USPC ..................................................... 455/226.1
See application file for complete search history.

(56) References Cited

U.S. PATENT DOCUMENTS

| | | | |
|---|---|---|---|
| 2015/0296477 A1 | 10/2015 | Pan et al. | |
| 2015/0302712 A1 | 10/2015 | Rosa et al. | |
| 2017/0069965 A9 | 3/2017 | Pu et al. | |
| 2017/0150578 A1 | 5/2017 | Dureiko et al. | |
| 2020/0329500 A1* | 10/2020 | Newman | H04W 74/0816 |

FOREIGN PATENT DOCUMENTS

| | | |
|---|---|---|
| WO | 2020043592 A1 | 3/2020 |
| WO | 2020164757 A1 | 8/2020 |

OTHER PUBLICATIONS

Zheng, Yue, et al., "Combating Cross-Technology Interference for Robust Wireless Sensing With Cots Wifi," School of Software and Tnlist, Tsinghua University, Dept. of Electronic Engineering, Tsinghua University, College of Computer, Nanjing University of Posts and Telecommunications, 978-1-5386-5156-8/18 IEEE, 2018 (9 Pages).

* cited by examiner

DETERMINING CAUSE OF MISSING RF MESSAGES

CROSS-REFERENCE TO PRIOR APPLICATIONS

This application is the U.S. National Phase application under 35 U.S.C. § 371 of International Application No. PCT/EP2021/079130, filed on Oct. 20, 2021, which claims the benefit of U.S. Provisional Patent Application No. 63/107,632, filed on Oct. 30, 2020 and European Patent Application No. 20205827.7, filed on Nov. 5, 2020. These applications are hereby incorporated by reference herein.

FIELD OF THE INVENTION

The present invention relates to a radio frequency (RF) system, a method for operating an RF system, and a computer program product for operating an RF system.

BACKGROUND OF THE INVENTION

WO 2020/43592 A1 shows devices in a wireless network for transmitting, receiving, and/or processing an RF signal for presence and/or location detection. In one embodiment, it is shown that high-bandwidth RF-based sensing is required for minor motion detection so that the sensing algorithm can with confidence determine whether the variation of wireless communication parameters with respect to a previous threshold/baseline are due to wireless channel noise or due to a person typing on a laptop while hardly moving otherwise.

SUMMARY OF THE INVENTION

It can be seen as an object of the present invention to provide an RF system, a method for operating the RF system, a computer program product for operating the RF system, and a computer readable medium which allow determination of a cause of missing RF messages.

In a first aspect of the present invention an RF system comprising multiple nodes configured for transmitting and/or receiving RF messages is presented. The RF system is configured for determining whether RF messages transmitted by a transmitting node of the RF system were completely received by one or more receiving nodes of the RF system. The RF system is further configured upon missing at least part of the RF messages at the one or more receiving nodes, for determining whether missing of at least part of the RF messages is caused by an activity event of a tangible entity in at least one transmission path between the transmitting node and the one or more receiving nodes based on one or more RF system criteria.

Since the RF system is configured for determining whether missing of at least part of the RF messages is caused by an activity event of a tangible entity in at least one transmission path between the transmitting node and the one or more receiving nodes based on one or more RF system criteria, the RF system may consider various RF system criteria in order to determine the cause for missing at least part of the RF messages. This allows to determine whether at least a part of an individual RF message of the RF messages and/or entire RF messages are missing, e.g., due to an activity event or due to wireless interference, e.g., caused by high wireless traffic or noise in the area in which the nodes are arranged. This may allow an improved further processing. For example, RF-based sensing performance may be improved as detection of activity events of a tangible entity, such as a human, an animal, or an object, may be improved.

Missing at least part of the RF messages includes missing at least a part of an individual RF message, missing one or more entire RF messages, or any combination thereof. An individual RF message may include different parts which may be missed, such as a header, a payload, or a tail part. One or several RF messages may be missed, for example, several subsequent RF messages may be missed. Also different parts of different RF messages may be missed.

The nodes being configured for transmitting and/or receiving RF messages means that every node of the multiple nodes may be configured for transmitting RF messages, for receiving RF messages, or for transmitting and receiving RF messages.

The RF system may be configured for performing RF-based sensing in order to detect sensing events.

The RF system may be configured for determining whether the RF messages were completely transmitted by the transmitting node of the RF system or whether at least part of the RF messages was not transmitted. The RF system may also be configured for determining if no part of the RF messages was transmitted. The RF system may be configured for determining, for example, for each individual RF message whether it was completely transmitted. For example, in case of bursts of RF messages, for the burst of the RF messages to be completely transmitted, each individual RF message of the burst of RF messages needs to be completely transmitted. If RF messages are continuously transmitted, the RF system may be configured for determining, for example, whether the individual RF messages in a certain time period or transporting a certain information were completely transmitted.

For example, the transmitting node may be configured for determining whether it completely transmitted the RF messages or transmitted at least a part of the RF messages. Transmitting at least a part of the RF messages includes any combination of RF messages of which at least one individual RF message is not completely transmitted, e.g., for a burst of three RF messages, two may be completely transmitted and one not at all or only partly. The transmitting node may be configured for providing information whether it completely transmitted the RF messages or at least part of the RF messages to the one or more receiving nodes. This allows to determine whether at least part of the RF messages is missing since the transmitting node did not completely transmit the RF messages. An individual RF message may be not transmitted, for example, if the transmitting node is occupied or not allowed to transmit at a certain moment in time at which the one or more receiving nodes expected a transmission of the individual RF message. Not transmitting the individual RF message by the transmitting mode may, for example, occur due to clear channel assessment (CCA) backoff times. Alternatively, the receiving nodes may be configured for determining from the received RF messages whether they were completely transmitted, e.g., if the RF messages are completely received than the RF messages must have been completely transmitted.

The RF system may be configured for obtaining data such as sensing metrics, e.g., signal quality metrics like received signal strength indicator (RSSI) or channel state information (CSI), or any other sensing metric, from the RF messages. RSSI and CSI may be analyzed over time to identify patterns and extract features that are indicative of an activity event. Signal quality metrics may also be analyzed over time for creating a sensing baseline.

Missing at least part of the RF messages means that at least a part of an individual RF message which includes information meant to be transported by the RF messages is not decodable, i.e., at least part of the information to be transported by the RF messages is missed. At least part of the RF messages is also missed, if an entire RF message which includes information meant to be transported by the RF messages is missed. Missing of at least part of the RF messages may be caused by strong attenuation of the RF messages. Alternatively, an RF message may be incorrect due to distortion which may cause a change of data in the RF message. The change of data may be detected, for example, based on a checksum, e.g., cyclic redundancy check (CRC).

If the RF system is configured for performing RF-based sensing, missing at least part of the RF messages may lead to blind time periods in which the RF system may not determine what has happened. Furthermore, data may be misinterpreted and false positives may be obtained. For example, RF-based sensing may have missed that a person got up from a couch in a living room and hence it is falsely detected that the person is still on the couch. False negatives, may also be obtained, e.g., fall detection may miss at least part of the RF messages at the very moment in which a person is decelerating with −5 g on a floor.

An individual RF message of the RF messages is considered to be entirely missing, for example, if it cannot be demodulated by the one or more receiving nodes. The RF messages may get affected by environmental factors during transmission, e.g., interference, such that the RF messages cannot be demodulated by the one or more receiving nodes. In this case, the one or more nodes cannot determine whether an RF signal received by the one or more nodes as input is an RF message or noise. For example, if the one or more nodes operate on Zigbee communication technology, the one or more nodes cannot determine if the RF signal received by the one or more nodes as input is a corrupted Zigbee RF message which the one or more nodes could demodulate under ideal conditions or if the RF signal is a WiFi RF message, which the one or more nodes will never be able to demodulate. This is the most severe form of missing an RF message and no sensing metrics may be extracted from the RF signal. In this case, the one or more nodes would not even detect that the one or more nodes received an RF message.

A part of the RF message is considered to be missing, if the RF message is affected in a less severe form, such that at least part of data to be transported by the RF message is not decodable. For example, a part of the RF message may still be decodable, such that the node may detect that it received an RF message for the communication technology, e.g., Zigbee or WiFi, on which it is operating. The data that is to be transported from one node to another node or over periods of time, however, cannot be obtained from the RF message.

An RF message is not considered to be missing, in case that the data to be transported by the RF message is decodable, even if another part of the RF message may be not decodable. For example, if the data to be transported by the RF messages is sensing metrics, e.g., RSSI or CSI, which is obtainable from a first part of the RF message, i.e., a header of the RF message, and only payload in data containers without information to be transported in a central part of the RF message is not decodable, the RF message is not considered to be missing. If on the other hand, for example, information to be transported by the RF messages is also included in the payload and the payload is missed, the RF message is considered to be missing.

The activity event may be, for example, a movement of a tangible entity, breathing of a tangible entity, falling of a tangible entity, or any other event which involves an activity of a tangible entity, such as an object, an animal, or a person.

The transmitting node may be configured for repeatedly transmitting RF messages. The RF messages may be repeatedly received by the receiving node of the RF system. The transmitting node may be configured for transmitting the RF messages, for example, according to a predetermined timing, e.g., according to a schedule. The schedule for a certain time period may be transmitted in one or more of the RF messages.

The transmitting node may be one of the multiple nodes of the RF system. The receiving node may also receive RF messages from two or more of the multiple nodes of the RF system.

RF-based sensing allows for the detection of various activity events taking place in a space or specific volume. Sensing algorithms or sensing analysis algorithms may detect and analyze how tangible entities within the space, i.e., sensing space or sensing area, affect RF signals. RF signals are used for transmitting the RF messages. RF-based sensing may be used as means for detecting and classifying user activity in homes, offices, etc. For example, based on Zigbee RF-based sensing messages being transmitted and received by nodes in form of smart lights, RF-based sensing may determine motion in a room and turn lights on or off automatically, nodes in form of WiFi routers may estimate breathing rate of people, etc.

The underlying principle for RF-based sensing is that distortions of RF signals in a space are both a function of the tangible entities in it, e.g., moving objects, as well as of the frequency of the RF signals. When RF-based sensing hops through a series of very different frequency bands, e.g., from 2.4 GHz WiFi to 5 GHz WiFi and then to 60 GHz as used by the upcoming WiFi 6 standard, this may yield distinctively different passive sensing results. However, also frequency channels in the same frequency band, e.g., in 2.4 GHz WiFi Channel 1 at 2412 MHz and WiFi Channel 13 at 2472 MHz, will influence the RF-based sensing results.

RF-based sensing can be performed in the RF system by transmitting RF signals from one node to another node and analyzing the received RF signals. If the RF signals interact with one or more tangible entities on their transmission paths between the nodes, the RF signals are disturbed, such as scattered, absorbed, reflected, or any combination thereof. These disturbances can be analyzed and used for performing RF-based sensing.

The disturbed and/or reflected RF signals can include an RF-based sensing fingerprint based on signal parameters, such as real and imaginary part of electrical permittivity and magnetic susceptibility. Different communication technologies have different absorption and reflection characteristics resulting in different RF-based sensing fingerprints. Using different communication technologies can allow to optimize the performance of the RF-based sensing.

The RF messages may be transmitted between the transmitting node and a receiving node via multiple transmission paths, e.g., a direct path between the transmitting node and the receiving node, as well as transmission paths in which different beams comprising the RF messages are shot through the space in which the transmitting node and the receiving node are arranged, being reflected and penetrating different materials. The receiving node receives the RF messages from multiple transmission paths such that the received RF messages include combined disturbing effects of the different transmission paths. A tangible entity in the at least one transmission path between the transmitting node and the receiving node may disturb the RF messages and cause missing of at least part of the RF messages.

The tangible entity may change a multipath behavior of the space in which the RF system and its nodes are arranged. The multipath behavior may affect the signal intensity of the transmitted RF messages. If, for example, the signal intensity of the transmitted RF messages becomes lower than background noise than the RF messages are missed. The change of the multipath behavior may include a change of a contribution of different transmission paths to the received RF messages. For example, a first transmission path may provide a signal above background noise, while a second transmission path may provide a signal below background noise, such that the combination of the transmission paths may result in missing at least part of the RF messages in dependence of the contribution of the first and second transmission path.

The transmitting node may be configured for transmitting RF messages at predetermined transmitting times and the one or more receiving nodes may be configured for expecting to receive the RF messages at predetermined receiving times. The predetermined transmitting times and/or predetermined receiving times may be included, e.g., in a schedule. This may allow to determine whether the RF messages transmitted by the transmitting node are received. The one or more receiving nodes may be configured for expecting some noise in the received RF messages, e.g., noise, such as wireless noise caused by known noise sources.

The RF messages may include RF-based sensing messages and RF data messages. The RF system may be configured for determining whether at least part of the RF-based sensing messages, whether at least part of the RF data messages or whether at least part of the RF-based sensing messages and at least part of the RF data messages are missing. The RF system criteria may include whether only at least part of the RF-based sensing messages, whether only at least part of the RF data messages, or whether at least part of the RF-based sensing messages and at least part of the RF data messages are missing. This may allow to determine a difference in message-delivery reliability between RF-based sensing messages and RF data messages. The RF-based sensing messages may be used for performing RF-based sensing. The RF data messages may be used for exchanging data between the nodes, e.g., for data communication or for establishing or maintaining a network infrastructure, e.g., a mesh network.

The RF system may also be configured for determining a discrepancy between missed parts of RF-based sensing messages and missed parts of RF data messages. The RF system criteria may include the discrepancy between the missed parts of the RF-based sensing messages and the missed parts of the RF data messages. This may allow an improved determination whether missing at least part of the RF messages is caused by an activity event of a tangible entity in the transmission paths between the transmitting node and the one or more receiving nodes as wireless interference sources typically transmit omnidirectionally. If parts of the RF-based sensing messages and parts of the RF data messages are missed at a similar rate, it may be concluded that a wireless interference source caused missing at least part of the RF messages. Wireless interference sources may include, for example, microwave ovens or other wireless transmitting devices which tend to have a uniform impact throughout the space they are arranged in.

A number of RF-based sensing messages and a number of RF data messages scheduled for transmission and/or transmitted by the transmitting node may be different. For example, more RF-based sensing messages may be scheduled for transmission and/or transmitted in a predetermined time period than RF data messages. The RF system may be configured for taking a ratio of scheduled transmissions of and/or transmitted RF-based sensing messages to RF data messages into account when determining the discrepancy between the missed parts of RF-based sensing messages and the missed parts of the RF data messages. The number of RF-based sensing messages may also be equal to the number of RF data messages scheduled for transmission and/or transmitted by the transmitting node. The discrepancy between the missed parts of RF-based sensing messages and the missed parts of RF data messages may include, for example, a difference of an amount of missed parts of RF-based sensing messages and an amount of missed parts of RF data messages or a ratio of the amount of the missed parts of the RF-based sensing messages and the amount of the missed parts of the RF data messages.

The transmitting node may be configured for broadcasting the RF messages. The one or more receiving nodes may be configured for re-transmitting the RF data messages and for not re-transmitting the RF-based sensing messages. This may allow to improve determining whether missing of at least part of the RF messages is caused by an activity event of a tangible entity in the transmission paths between the transmitting node and the one or more receiving nodes. The RF messages may be transmitted to all nodes equally. The RF system may be configured for single-hop broadcasting the RF-based sensing messages, i.e., upon receiving the RF-based sensing messages, the nodes do not re-transmit the RF-based sensing messages. The one or more receiving nodes may be configured for re-transmitting the RF data messages based on multi-hop broadcasting or by unicasting, i.e., transmitting the RF data messages to a specific other node. For example, on mesh networks, a node may serve as an intermediate node between two other nodes. In this case RF data messages may be unicasted, for example, between a first node and the intermediate node and the intermediate node and a second node in order to transmit the RF data messages from the first node to the second node. Re-transmitting the RF data messages may significantly increase likelihood of the RF data messages to be received by all of the nodes. This may allow to improve delivery reliability in the RF system. The RF system may be configured for performing RF-based sensing, for example, based on Zigbee communication technology using single-hop broad casting.

At least two nodes of the RF system may have different transmitting capabilities, different receiving capabilities, different processing capabilities, or a combination thereof. The RF system criteria may include the different transmitting capabilities of the nodes, the different receiving capabilities of the nodes, the different processing capabilities of the nodes, or the combination thereof. The combination thereof may include any combination of different transmitting capabilities, different receiving capabilities, and different processing capabilities. Two nodes may have, for example, different transceiving capabilities and different receiving capabilities. This allows taking into account different capabilities of the nodes resulting in different abilities of the nodes to transmit, receive, and process RF messages. Different transmitting and receiving capabilities may be based on different transceiver units and/or antenna arrays included in the different nodes, such that the nodes may have, for example, different receiver sensitivity. For example, older or simpler nodes may not be able to receive parts of the RF messages due to low intensity and/or signal-to-noise ratio (SNR) of the RF messages, while newer or technologically advanced nodes may be able to receive these parts of the RF messages. Different processing capabilities may be based on different processors included in the nodes. Some nodes may also not be able to process RF messages fast enough due to a slower processor, e.g., a central processing unit (CPU), such that in times of high traffic density, the nodes are not able to process all RF messages before they are discarded in order to receive new messages.

Different type of nodes may have different capabilities. The RF system criteria may include the type of the nodes of the RF system. Alternatively, or additionally, the RF system criteria may include the type of the transmitting node and/or the type of the one or more receiving node.

The RF system criteria may include a status of the nodes, e.g., the transmitting node and/or the one or more receiving nodes. The status of a node may include, for example, transitioning from one operation mode to another operation mode or operating in an operation mode, e.g., operating in standby mode, transmitting mode, receiving mode, or the like. For example, a certain receiving node operating in transmitting mode may miss parts of the RF messages as it is more frequently occupied with transmitting compared to other receiving nodes, i.e., the receiving node operating in transmitting mode is not able to receive RF messages during transmitting. Missing of parts of the RF messages may in this case be related to the status of the receiving node and not to an activity event of a tangible entity in the transmission paths. This may allow to improve detection whether missing of at least part of the RF messages is caused by an activity event of a tangible entity in the transmission path. The status of a node may also include a state of the node, such as components of the node being broken or outdated, such as software or firmware being outdated and requiring an update.

The RF system may be configured for performing RF-based sensing based on part of the RF messages that was not missed at the one or more receiving nodes and based on whether missing of at least part of the RF messages is caused by an activity event of a tangible entity in the at least one transmission path between the transmitting node and the one or more receiving nodes. This allows improving RF-based sensing as much information as possible is obtained from the RF messages compared to the prior art in which RF messages with incorrect parts are typically discarded and not further processed. Obtaining as much information as possible from RF messages with missing parts may allow to obtain additional information for detecting an activity event by determining, for example, whether the RF message was of the correct type, originates from a desired transmitting node, or the like, such that the RF system may perform RF-based sensing even if a substantial part of the RF messages gets corrupted. The RF system may be configured for using as much data of the parts of the RF messages that were not missed for performing RF-based sensing. This may allow improving granularity.

The RF system may be configured for receiving wireless noise at the nodes from their respective surroundings over a time period. Additionally, the RF system may be configured for determining respective noise baselines for the nodes based on the received wireless noise. The RF system criteria may include the noise baseline of the transmitting node, the respective noise baselines of the one or more receiving nodes or the noise baseline of the transmitting node and the respective noise baselines of the one or more receiving nodes. Receiving wireless noise, i.e., background noise, at the nodes from their respective surroundings over a time period allows establishing noise baselines by recording the wireless noise which may be quite transparent to activity events as activity events in general do not significantly add to background noise level and thus do not significantly add to noise baseline. The noise baselines may be used for improving detection of what caused missing at least part of the RF messages. For example, if a respective noise baseline of a respective receiving node does not change and at least part of the RF messages is missed, it may be concluded that the parts of the RF messages were not missed due to wireless noise. This may allow to conclude that at least part of the RF message may be missed due to an activity event of a tangible entity, e.g., an object in the transmission paths, which does not significantly add to noise baseline, if also other sources for missing the RF messages can be excluded. If, for example, the respective noise baseline is significantly changed, it may be concluded that at least part of the RF messages is missed due to wireless noise, e.g., due to WiFi traffic.

The noise baselines may be stored in the nodes as historic records, e.g., for past time periods or a certain number of previous RF messages. The noise baselines may be exchanged between different nodes. For example, a pair of transmitting node and receiving node may exchange their noise baselines in order to determine a relative noise baseline when exchanging RF messages between them. Furthermore, for example, if a new node joins the RF system at a location close to other nodes of the RF system, they may provide their noise baselines, e.g., in form of historic records to the new node. The new node may start operating based on the noise baselines and may generate its own noise baseline over time.

At least one of the nodes may include two different communication technologies. The at least one of the nodes may be configured for transmitting and/or receiving RF messages based on one of the communication technologies. Additionally, the at least one of the nodes may be configured for receiving wireless noise from its surroundings based on the other communication technology while transmitting or receiving the RF messages. This may allow determining a local noise environment of the transmitting node and/or one or more of the receiving nodes during transmitting and/or receiving of RF messages. At least one of the nodes may include, two, three, or any other number of nodes that include two different communication technologies. These nodes may be configured for transmitting and/or receiving RF messages based on one of the communication technologies and for receiving wireless noise from their respective surroundings based on the other communication technology while transmitting or receiving the RF messages.

The at least one of the nodes may include, for example, two or more different radios, each of them including one or more different communication technologies. The wireless noise received by the at least one of the nodes from its surrounding may include an amount of wireless power at the frequency or frequencies used for exchanging RF messages between the at least one of the nodes and one or more other nodes during their exchange. For example, a first communication technology used by the transmitting node may be used for transmitting RF-based sensing messages for performing RF-based sensing. A second communication technology used by the transmitting node may be used for receiving an amount of wireless power at the transmission frequency used for transmitting the RF-based sensing messages during their transmission. The transmission frequency includes one or more frequency channels used by the transmitting node for transmitting the RF messages. The received amount of wireless power is a combination of the wireless power transmitted by the first communication technology and wireless power caused by background noise, i.e., wireless noise. The amount of wireless power at the transmission frequency used for transmitting the RF-based sensing messages during transmission may be stored as information about the local noise environment of the transmitting node. The transmitting node may be configured for transmitting the information about its local noise environment to the receiving node. The receiving node may be configured for using the information about the local noise environment of the transmitting node by applying a correction factor or interpolating values differently when performing RF-based sensing. The receiving node may be configured, for example, for cancelling RF signal drops due to wireless power caused by background noise in the local environment of the transmitting node. This may allow to improve RF-based sensing and to determine which caused missing at least part of the RF messages.

A communication technology is defined by a setting of communication technology parameters including a communication protocol, one or more frequency channels, a frequency channel bandwidth of the respective frequency channel, a number of streams, a stream data rate, and a modulation. Changing the setting by changing one of the communication technology parameters typically changes the communication technology. The communication technologies may include single-channel communication technologies and multi-channel communication technologies. Each of the frequency channels has a center frequency and a frequency channel bandwidth. The frequency channels may have partially overlapping frequencies. Hopping through different frequency channels of a set of frequency channels can be performed for minimizing interference of RF signals, for example, in case a multi-channel communication technology is used for performing RF-based sensing such as a Bluetooth communication protocol, e.g., Bluetooth low energy (BLE). Changing a frequency channel to another frequency channel of the set of frequency channels of the communication technology does not change the communication technology if the communication technology is defined by the set of frequency channels. Changing a frequency channel of the communication technology to another frequency channel changes the communication technology if the communication technology is defined by only one frequency channel.

The communication technology parameters can additionally include one or more of a demodulation and a directionality. For example, a certain modulation can be demodulated in different ways by two or more different demodulations, such as for example to balance a demodulation speed and a demodulation error rate. Directionality can, for example, include omnidirectional and directional transmission. Omnidirectional transmissions can, for example, allow a volumetric view of the sensing volume, while directional transmissions can, for example, allow a narrow beam, e.g. for scanning like a laser scanner or for having a fixed directionality.

The communication protocol included in the communication technology parameters for a certain communication technology can include a cellular radio communication protocol, Zigbee, Bluetooth, BLE, Thread, a WiFi communication protocol, or any other wireless communication protocol. In other words, the communication technologies may include communication protocols such as a cellular radio communication protocol, Zigbee, WiFi, BLE, Thread, or any other wireless communication protocol. Cellular radio communication protocols may, for example, include 5G, 4G, 3G, or any other cellular radio communication protocol. WiFi communication protocols may include protocols of the IEEE 802.11 family, such as IEEE 802.11ax and IEEE 802.11ay.

The frequency channels included in the communication technology parameter can include frequency values, for example, in the GHz range, such as 2.4 GHz band, 5 GHz band, and 60 GHz band, including for example different frequency channels in the same band, e.g., 2412 MHz and 2472 MHz in the 2.4 GHz band. The frequency channels may also include frequency values in the frequency bands ranging from 450 MHz to 6 GHz, e.g. for sub-6 GHz 5G or from 24.250 GHz to 52.600 GHz for millimeter-wave 5G.

The number of streams included in the communication technology parameter can include, for example, one or more streams, such as 2, 3, or 4 streams. The maximal number of streams can, for example, depend on the number of multiple input multiple output (MIMO) channels.

The modulation included in the communication technology parameter can include, for example, orthogonal frequency-division multiplexing (OFDM), direct-sequence spread spectrum (DSSS), frequency-hopping spread spectrum (FHSS), on-off keying (OOK), binary phase shift keying (BPSK), quadrature phase shift keying (QPSK), quadrature amplitude modulation (QAM), or any other modulation.

Values of the communication technology parameters can also be included and selected from standards, such as standards for communication protocols published by the IEEE, such as IEEE 802.15.4, IEEE 802.11ax, IEEE 802.11ay, or any other communication protocol.

A single-channel communication technology is a communication technology which transmits an RF message using a single frequency channel. i.e., the single-channel communication technology uses a single frequency channel with a certain center frequency and frequency channel bandwidth for transmitting the RF message. The single frequency channel can include a frequency range defined by the center frequency and the frequency channel bandwidth, i.e., the single frequency channel is not limited to its center frequency, but can also, for example, include neighboring frequencies in dependence of the frequency channel bandwidth. Furthermore, sideband emissions, i.e., out-of-band emissions, may occur outside of the standardized frequency band defined by the center frequency and frequency channel bandwidth. The single channel-communication technology may use a communication protocol which may in general allow performing RF-based sensing by using multiple frequency channels, which communication protocol, however, in this case is limited to using only one single frequency channel for transmitting the RF message. The single-channel communication technology may include, for example. Zigbee or a WiFi communication protocol. The single-channel communication technology may also include a single-channel communication protocol, i.e., a communication protocol which can perform RF-based sensing only by using a single frequency channel for transmitting RF messages. Using a single-channel communication technology for performing RF-based sensing may allow lowering calculation effort and complexity of RF-based sensing.

A multi-channel communication technology is a communication technology which hops through multiple frequency channels during the transmission of an RF message. Alternatively, or additionally, the multi-channel communication technology may also use the multiple frequency channels in parallel. The multi-channel communication technology may include a multi-channel communication protocol such as BLE. Each RF message may be chopped into parts and transmitted using different frequency channels of the multi-channel communication technology. For example, BLE can transmit the header of an RF message in the BLE channel 5, then the first half of the payload in channel 9, and the second half in channel 20. Using a multi-channel communication technology for performing RF-based sensing may allow RF-based sensing with higher accuracy as the effects tangible entities and the environment have on the RF signals differ slightly depending on the frequency used.

The same communication protocol may be included in a single-channel communication technology and a multi-channel communication technology. In this case the communication protocol is limited to using only one single frequency channel for transmitting the RF message for the single-channel communication technology while for the multi-channel communication technology multiple frequency channels are used for transmitting the RF message.

The transmitting node may be configured for transmitting the RF messages based on one communication technology and transmitting configuration information for the transmission of the RF messages based on the other communication technology. The configuration information may include, for example, an amount of wireless power observed in a frequency spectrum used for transmitting the RF messages at a time of transmitting the RF messages or during transmitting the RF messages.

The RF system criteria may include the received wireless noise of the transmitting node while transmitting the RF messages, the received wireless noise of the one or more receiving nodes while receiving the RF messages, or the received wireless noise of the transmitting node and the received wireless noise of the one or more receiving nodes while transmitting or receiving the RF messages. This may allow improving determining what caused missing of at least part of the RF messages. If the received wireless noise is high, causing a low SNR, then disturbances caused by an activity event of a tangible entity in the transmission paths are more likely to disrupt an RF message, resulting in missing at least part of the RF messages. For example, a human body has an average absorption rate of 3 dB.

The RF system may be configured for adapting a setting of communication technology parameters of the transmitting node based on the received wireless noise from its surroundings, based on the received wireless noise of the one or more receiving nodes, or based on the received wireless noise from its surroundings and the received wireless noise of the one or more receiving nodes such that a certain SNR for the RF messages is maintained. Maintaining at least a certain SNR for the RF messages may allow an improved determination of what caused missing at least part of the RF messages. The setting of communication technology parameters may be adapted, for example, by adapting a transmission power of the transmitting node, a transmission frequency of the transmitting node, or the transmission power and the transmission frequency of the transmitting node based on the received wireless noise from its surroundings and/or based on the received wireless noise of the one or more receiving nodes such that a certain SNR for the RF messages is maintained. Adapting the transmission frequency may include, for example, slightly shifting the center frequency used for transmitting the RF messages, for instance, to minimize wireless interference, e.g., from a sideband emission by an external wireless network system bleeding into the frequency band used by the transmitting node for transmitting the RF messages.

The RF system criteria may include which of the nodes missed at least part of the RF messages. This may allow to improve determining whether background noise caused missing at least part of the RF messages. The RF system may be configured for determining a reception gap pattern based on which of the nodes missed at least part of the RF messages. If the reception gap pattern shows synchronicity, e.g., within a certain time period, for neighboring nodes arranged in proximity to each other, i.e., the neighboring nodes missed at least part of the RF messages, may allow to conclude that missing of at least part of the RF messages was caused by background noise. It may be concluded that missing of at least part of the RF messages was caused by background noise in this case as impact of wireless interference caused by background noise sources tends to be volumetrically uniform throughout a local space in which the neighboring nodes are arranged. In contrast activity events caused by an activity event of a tangible entity in the transmission path is much more localized, causing only a limited number of the neighboring nodes to miss at least part of the RF messages.

The RF system may be configured for determining that missing of at least part of the RF messages is caused by wireless noise if a number of neighboring nodes above a certain message missing threshold missed at least part of the RF messages. Alternatively, or additionally, the RF system may be configured for determining that missing of at least part of the RF messages is caused by an activity event of a tangible entity in the transmission paths between the transmitting nodes and the neighboring nodes if a number of neighboring nodes below a certain message missing threshold missed at least part of the RF messages. This may allow to improve determining what caused missing at least part of the RF messages.

The RF system may be configured for detecting reoccurring wireless interference caused by local background noise sources activated for certain time periods. The RF system criteria may include reoccurring wireless interference. For example, in a certain space reoccurring wireless interference may be caused by local background noise sources at certain time periods, for example, a microwave oven or WiFi streaming activated at certain time periods. Taking this information into account when determining what caused missing at least part of the RF messages, may improve determining what caused missing at least part of the RF messages. The microwave oven and the WiFi streaming, e.g., on a tablet computer, may for example cause wireless interference in the 2.4 GHz frequency band. The reoccurring wireless interference may be activated for a time period extending over several intervals of RF message transmission, e.g. 30 Hz to 1000 Hz for WiFi and 5 Hz for Zigbee. RF-based sensing messages may be transmitted, for example, for a time period of 0.5 to 10 seconds in order to perform RF-based sensing. The local background noise sources may be considered to be quasi static in this case and to cause missing of at least part of the RF messages for the nodes in the local space in proximity to the local background noise by wireless interference. Any activity event of a tangible entity in the local space has a more localized disturbing effect on the nodes. This may allow to determine whether an activity event of a tangible entity caused missing of at least part of the RF messages if, for example, different amounts of RF messages are missed by different nodes.

The RF system may be configured for determining a time dependent reception gap pattern for RF messages, e.g., RF-based sensing messages. The time dependent reception gap pattern may indicate reocurring wireless interference, e.g., caused by some scheduled operation of external wireless network systems in the space in which the nodes of the RF system are arranged. The time dependent reception gap pattern for the RF messages may allow detecting reocurring wireless interference caused by local background noise sources activated for certain time periods.

The RF system may be configured for determining a duration of a gap between receiving RF messages. The RF system criteria may include the duration of the gap between receiving the RF messages. The RF system may be configured for determining whether missing of at least part of the RF messages is caused by an activity event of a tangible entity in the at least one transmission path between the transmitting node and the one or more receiving nodes based on the duration of the gap between receiving the RF messages.

RF messages have short durations such that it is unlikely that multiple subsequently transmitted RF messages all collide with each other. The RF system may be configured for determining that missing of at least part of the RF messages is not caused by an activity event if the duration of the gap between receiving the RF messages is below a certain threshold duration. In this case missing of the RF messages may be determined to be caused by wireless interference. The RF system may be configured for determining that missing of at least part of the RF messages is caused by an activity event of a tangible entity in the at least one transmission path between the transmitting node and the one or more receiving nodes if the duration of the gap is above the certain threshold duration. An activity event has a longer duration than RF messages, e.g., a few seconds. In this time, for example, a few dozen RF messages may be transmitted and/or received. The certain threshold duration may be determined, for example, based on historical learnings, an average message delay measured as time between consecutive receptions detected while baselining the RF system, or the like.

The RF system may be configured for determining context information for transmitting the RF messages, e.g., what happened before at least part of the RF messages were missed. For example, a tangible entity approaching the sensing space may have a gradual deteriorating impact on the transmission of the RF messages even if the tangible entity is not within the at least one transmission path but only in its proximity. For example, for RF-based sensing, RF-based sensing messages may be transmitted with a repetition frequency of, e.g., between 30 Hz to 1000 Hz such that proximity of a tangible entity to the at least one transmission path may be determined as context information from gradual deteriorating impact for RF-based sensing. In case that RF messages are transmitted via multiple transmission paths between the transmitting node and a receiving node, some of the transmission paths may already be disturbed while others are not disturbed, not causing missing parts of the RF messages. When the tangible entity changes its position other transmission paths may be disturbed causing missing of at least part of the RF messages. A tangible entity may also be arranged in a space without moving causing an RF sensing variability compared to the situation of the space without the tangible entity. Using context information may allow to improve determining what caused missing of at least part of the RF messages, e.g., by improving confidence of sensing algorithms in detecting an activity event. For example, if the context information indicates that there is no activity event to be expected, e.g., as no tangible entity is in proximity of the at least one transmission path between the transmitting node and the one or more receiving nodes, missing of at least part of the RF messages may be determined to be not caused by an activity event of a tangible entity. If other reasons may be excluded, in this case the RF system may be configured to determine that missing of at least part of the RF messages is caused by wireless interference.

The RF system may be configured for determining whether missing of at least part of the RF messages changes gradually or immediately. The RF system criteria may include whether missing of at least part of the RF messages changes gradually or immediately. A gradual change indicates an activity event of a tangible entity while an immediate change of missing at least part of the RF messages indicates wireless interference. This may allow an improved determination for what caused missing of the at least part of the RF messages. The RF system criteria may include the context information. Taking into account context information may allow to improve determining what caused missing of at least part of the RF messages. The RF system may be configured for determining whether missing of at least part of the RF messages is caused by an activity event of a tangible entity in the at least one transmission path between the transmitting node and the one or more receiving nodes based on the context information. For example, context information may include a location in which the RF system is arranged, e.g., an apartment building, an office building, or the like. Context information may also include, for example, a date, such as a day of the week and/or a certain time, e.g., on a certain day of the week. For example, RF-based sensing is more likely to be affected by WiFi interference in an apartment building between 6 pm and 11 pm when most families are at home using appliances, e.g., watching TV, playing video games or the like, than between 2 am and 5 am in the night when most families are asleep. Patterns of use of appliances that may cause wireless interference may be different on different dates, even on different days, e.g., weekdays compared to the weekend. Context information may also include, for example, information about a number of people typically present in a building, flat, or room, for example, based on geofencing, pinging of smartphones or the like. If a single person lives in a flat and is detected to be in the living room, it is highly likely that missing at least part of the RF messages in another room is not caused by him, i.e., his activity, but rather by, e.g., wireless interference. Furthermore, context information may include, for example, information about a type and/or state of external devices. For example, if a WiFi security camera is arranged in the living room and is streaming at the moment when at least part of the RF messages are missed, it is more likely that wireless interference caused missing of the at least part of the RF messages than if passive infrared sensors (PIR) sensors that rarely transmit are operated instead of the WiFi security camera.

In a further aspect of the present invention a method for operating an RF system comprising multiple nodes configured for transmitting and/or receiving RF messages is presented. The method comprises the steps:

receiving RF messages transmitted by a transmitting node at one or more receiving nodes, determining whether the RF messages were completely received by the one or more receiving nodes, and upon missing at least part of the RF messages at the one or more receiving nodes, determining whether missing of at least part of the RF messages is caused by an activity event of a tangible entity in at least one transmission path between the transmitting node and the one or more receiving nodes based on one or more RF system criteria.

The method may comprise the step:

determining whether the RF messages were completely transmitted by the transmitting node or whether at least part of the RF messages was transmitted by the transmitting node.

The method may comprise one or both of the steps:

transmitting an information to the one or more receiving nodes that the RF messages were completely transmitted by the transmitting node if it is determined that the RF messages were completely transmitted by the transmitting node, or transmitting an information to the one or more receiving nodes that at least part of the RF messages was transmitted by the transmitting node if it is determined that at least part of the RF messages was transmitted by the transmitting node.

Additionally, or alternatively, the method may comprise one or more of the steps:

when the RF messages include RF-based sensing messages and RF data messages, determining whether at least part of the RF-based sensing messages, whether at least part of the RF data messages, or whether at least part of the RF-based sensing messages and at least part of the RF data messages are missing, when the RF messages include RF-based sensing messages and RF data messages, determining a discrepancy between missed parts of RF-based sensing messages and missed parts of RF data messages, broadcasting the RF messages by the transmitting node, re-transmitting the RF data messages and not re-transmitting the RF-based sensing messages by the one or more receiving nodes, performing RF-based sensing based on part of the RF messages that was not missed at the one or more receiving nodes and based on whether missing of at least part of the RF messages is caused by an activity event of a tangible entity in the at least one transmission path between the transmitting node and the one or more receiving nodes, receiving wireless noise at the nodes from their respective surroundings over a time period, determining respective noise baselines for the nodes based on the received wireless noise, when at least one of the nodes includes two different communication technologies, transmitting RF messages based on one of the communication technologies by the at least one of the nodes and receiving wireless noise from its surroundings by the at least one of the nodes based on the other communication technology while transmitting the RF messages, when at least one of the nodes includes two different communication technologies, receiving RF messages based on one of the communication technologies by the at least one of the nodes and receiving wireless noise from its surroundings by the at least one of the nodes based on the other communication technology while receiving the RF messages, when at least two of the nodes include two different communication technologies, transmitting RF messages based on one of the communication technologies by one of the at least two nodes, receiving the RF messages based on the same communication technology by the other one of the at least two nodes and receiving wireless noise from their respective surroundings by the at least two nodes based on the other communication technology while transmitting or receiving the RF messages, adapting a setting of communication technology parameters of the transmitting node based on the received wireless noise from its surroundings, based on the received wireless noise of the one or more receiving nodes, or based on the received wireless noise from its surroundings and the received wireless noise of the one or more receiving nodes such that a certain signal-to-noise ratio for the RF messages is maintained, and providing that the RF system criteria include one or more of:

whether only at least part of the RF-based sensing messages, whether only at least part of the RF data messages, or whether at least part of the RF-based sensing messages and at least part of the RF data messages are missing, the discrepancy between the missed parts of the RF-based sensing messages and the missed parts of the RF data messages, different transmitting capabilities of the nodes, different receiving capabilities of the nodes, different processing capabilities of the nodes, or a combination thereof, the noise baseline of the transmitting node, the respective noise baselines of the one or more receiving nodes, or the noise baseline of the transmitting node and the respective noise baselines of the one or more receiving nodes, the received wireless noise of the transmitting node while transmitting the RF messages, the received wireless noise of the one or more receiving nodes while receiving the RF messages, or the received wireless noise of the transmitting node and the received wireless noise of the one or more receiving nodes while transmitting or receiving the RF messages, and which of the nodes missed at least part of the RF messages.

In a further aspect of the present invention a computer program product for operating an RF system comprising multiple nodes configured for transmitting and/or receiving RF messages is presented. The computer program product comprises program code means for causing a processor to carry out the method discussed above, or any embodiment of the method, when the computer program product is run on the processor.

In a further aspect a computer readable medium having stored the computer program product discussed above is presented. Alternatively or additionally the computer readable medium can have the computer program product according to any embodiment of the computer program product stored.

It shall be understood that the RF system, the method, the computer program product, and the computer readable medium discussed above have similar and/or identical preferred embodiments.

It shall be understood that a preferred embodiment of the present invention can also be any combination of the above embodiments.

These and other aspects of the invention will be apparent from and elucidated with reference to the embodiments described hereinafter.

DETAILED DESCRIPTION OF EMBODIMENTS

Figure 1:
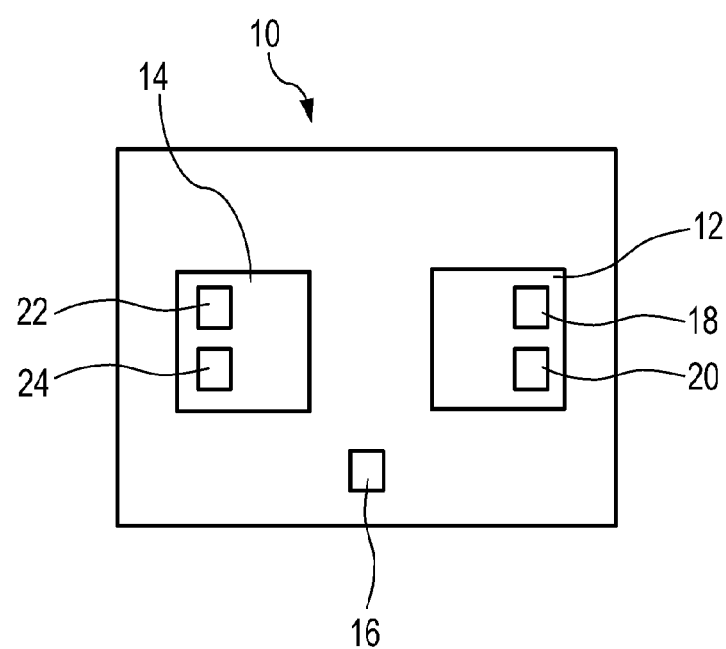
FIG. 1 shows schematically and exemplarily a node for an RF system.

FIG. 1 shows schematically and exemplarily an embodiment of a node 10. The node 10 can for example be included in an RF system, such as connected lighting (CL) system 100 of FIGS. 2 and 3. In the following we describe details for an exemplary node 10 that may be used in the CL system 100 before providing details about the functionality of the CL system 100.

The node 10 comprises a control unit 12, a transceiver unit 14, and an antenna array 16. Instead of an antenna array, a single antenna may also be included in the node. The control unit 12 includes a processor 18 and a computer readable medium in form of memory 20.

In this embodiment, the transceiver unit 14 includes two different communication technologies, e.g., based on the Zigbee communication protocol and based on the WiFi communication protocol. In other embodiments, the transceiver unit may also include, for example, communication technologies based on Thread, cellular radio, Bluetooth, or BLE communication protocols, or a communication technology based on any other communication protocol. The transceiver unit 14 includes a Zigbee transceiver 22 and a WiFi transceiver 24. The Zigbee transceiver 22 uses a specific Zigbee communication technology in this embodiment. The Zigbee communication technology may, for example, use values of the communication technology parameters of one of the alternatives as defined by the IEEE 802.15.4 communication protocol and/or the Zigbee standard. The WiFi transceiver 24 uses WiFi communication technology.

Figure 2:
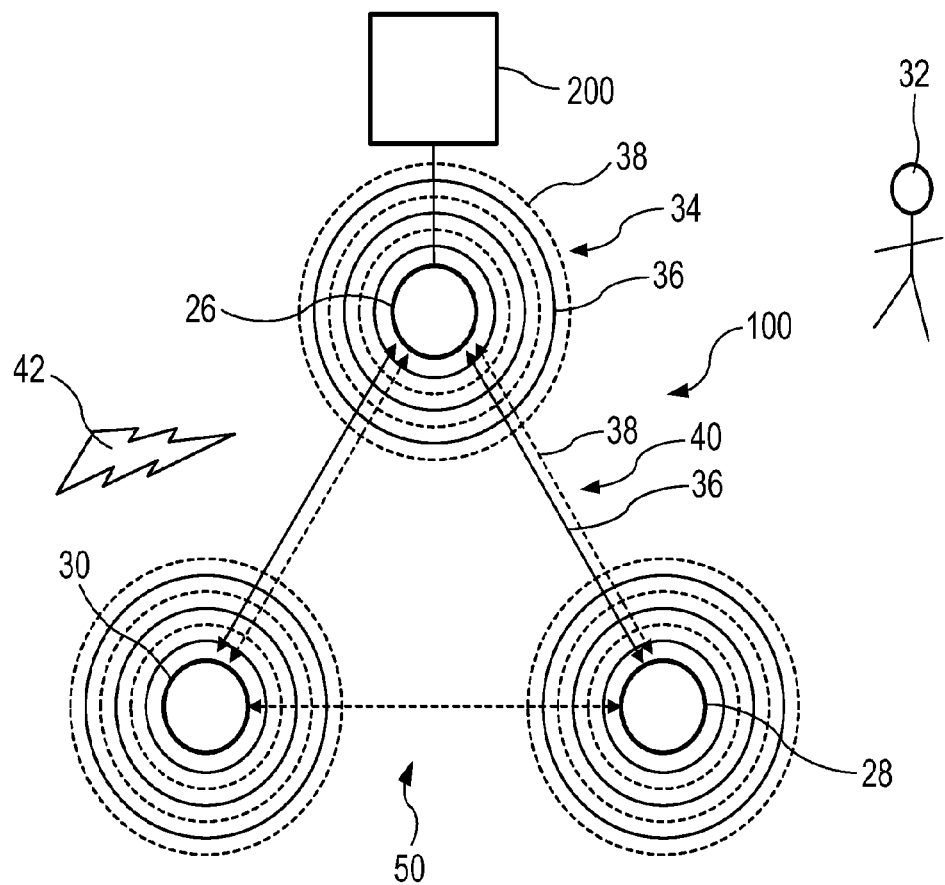
FIG. 2 shows schematically and exemplarily an embodiment of an RF system with three nodes with a user outside of a sensing space.
Figure 3:
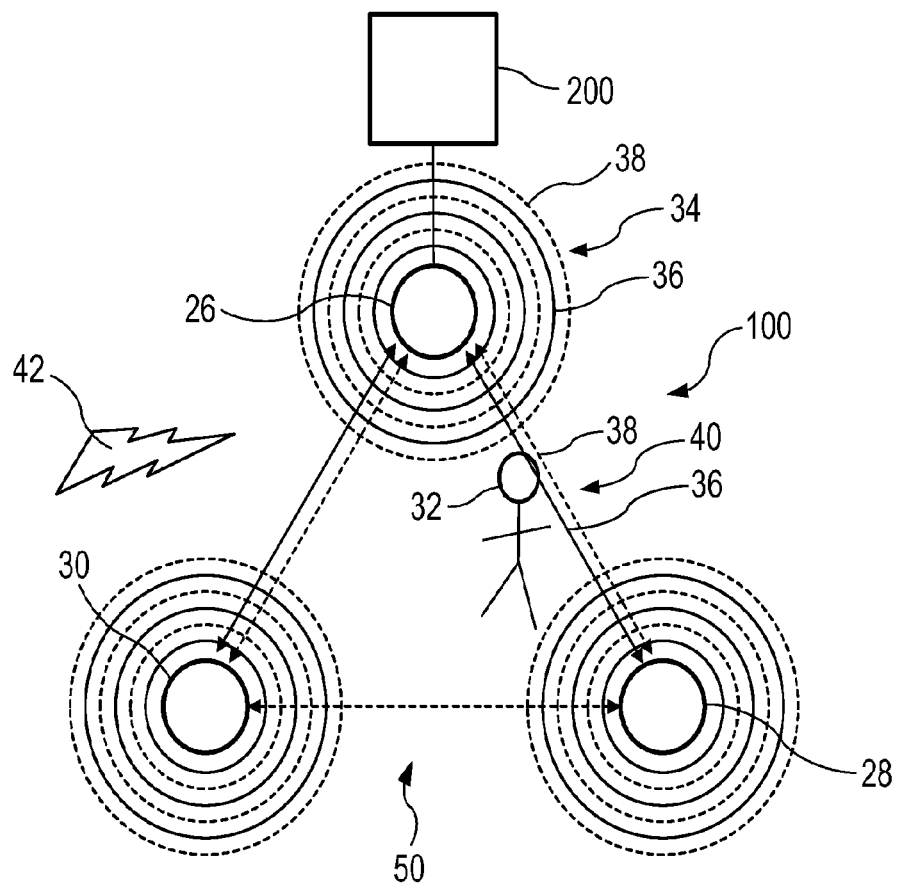
FIG. 3 shows schematically and exemplarily the embodiment of the RF system with the user inside of the sensing space causing disturbance of RF messages exchanged between nodes.

The transceiver unit 14 uses the antenna array 16 for transmitting the RF signals to nodes and receiving RF signals from nodes of the CL system 100 for exchanging data including RF messages 34 wirelessly between the nodes and for performing RF-based sensing (cf. FIGS. 2 and 3). This allows the node 10 to exchange data using RF data messages 38 and to perform RF-based sensing using RF-based sensing messages 36. The RF signals transmitted from one node to another node may be disturbed. e.g., by a tangible entity such as user 32 within transmission path 40 between the nodes 26 and 28 shown in FIG. 3. The RF signals disturbed by user 32 in the transmission path 40 can be analyzed in the control unit 12 for performing RF-based sensing.

The memory 20 of the control unit 12 stores a computer program product for operating the CL system 100. The computer program product includes program code means for causing processor 18 to carry out a method for operating the CL system 100 when the computer program product is run on the processor 18, e.g., the method as presented in FIG. 4. The memory 20 further includes a computer program product for operating the node 10 and optionally also the whole CL system 100, e.g., for controlling the functions of the node and controlling the functions of the nodes of the CL system, for example, in order to provide lighting as well as for performing RF-based sensing.

Furthermore, the memory 20 stores the RF system criteria, as well as settings of communication technology parameters of the communication technology or communication technologies used for performing RF-based sensing.

The CL system 100 shown in FIGS. 2 and 3 includes three nodes 26, 28, and 30 and is connected with an external server 200 via the node 26. In other embodiments, the RF system may also include a different number of nodes, e.g., two, four or more. In this embodiment, the nodes 26, 28, and 30 are of the type of the node 10 shown in FIG. 1. The type of the nodes may also be different in other embodiments, e.g., including only a single communication technology.

The nodes may, for example, be routers, bridges, lights, luminaires, switches, plugs, or sensors. Node 26 is a bridge in this embodiment and the other nodes 28 and 30 are luminaires for providing light. Node 26 has larger capabilities, including larger transmitting capabilities, larger receiving capabilities, and larger processing capabilities than nodes 28 and 30. In other embodiments, the nodes may have the same capabilities or different nodes of the RF system may have different transmitting capabilities, different receiving capabilities, different processing capabilities, or a combination thereof.

The server 200 is a server of a building management system (BMS) and serves for controlling lighting functions of the CL system 100. Besides performing lighting functions, the nodes 26, 28, and 30 additionally are configured for performing RF-based sensing. This allows using the wireless infrastructure of the CL system 100 to perform RF-based sensing, increasing the functionality of the CL system 100. RF-based sensing can, for example, be used for motion detection, presence detection, people counting, breathing rate measurements, heart rate measurements, shape detection, gesture detection, fall detection, or for performing other sensing applications.

The nodes 26, 28, and 30 transmit and receive RF signals including RF messages 34. The RF messages 34 include RF-based sensing messages 36 and RF data messages 38. The RF-based sensing messages 36 are used for performing RF-based sensing. The RF data messages 38 are used for data exchange, such as control commands or other data. The RF data messages 38 may besides exchanging data additionally be used for performing RF-based sensing. Hence, the RF-based sensing messages 36 and the RF data messages 38 may both be used for performing RF-based sensing as information regarding disturbances of the RF-based sensing messages 36 and the RF data messages 38 may be processed in order to perform RF-based sensing. In this embodiment, RF-based sensing messages 36 and RF data messages 38 are used for performing RF-based sensing in that RSSI or CSI are obtained from each successfully received RF message.

The CL system 100 is used for determining whether the RF messages 34 transmitted by a transmitting node are completely transmitted and whether they are completely received by one or more receiving nodes. In the configurations shown in FIGS. 2 and 3, node 26 acts as transmitting node that transmits RF messages 34 and nodes 28 and 30 act as receiving nodes. Upon missing at least part of the RF messages 34 at the one of the receiving nodes 28 and 30, the CL system 100 determines whether missing of at least part of the RF messages 34 is caused by an activity event of a tangible entity in form of user 32 in transmission path 40 between the transmitting node 26 and the receiving node 28 based on one or more RF system criteria.

In the configuration of FIG. 2 user 32 is outside of sensing space 50 and does not cause missing of RF messages 34. In the configuration of FIG. 3 the user 32 is within the sensing space 32 causing missing of at least part of the RF messages 34, namely of the RF-based sensing messages 36 in transmission path 40 between transmitting node 26 and receiving node 28. In other embodiments, wireless interference may cause missing of at least part of the RF messages. Receiving RF messages is not an instantaneous event. Every byte of an RF message is transmitted sequentially by the transmitting node such that interference may affect and corrupt just a part of the RF message. A CRC code may be added at an end of a payload of every RF message of the RF messages. This may allow to determine whether an RF message was completely transmitted. Activity events may lead to missing entire RF messages or several subsequent RF messages while wireless interference may also result in missing only parts of the RF messages, such as header, center part, or trailing part of an RF message. If, for example, a trailing part of an RF message gets corrupted, in prior art the RF message would be rejected. However, the leading part of the RF message may be correct and include useful information for performing RF-based sensing.

In the following the functionality of the CL system 100 is explained.

The transmitting node 26 broadcasts the RF messages 34, i.e., the RF messages 34 are transmitted to all nodes equally without targeting any of the nodes specifically. In other embodiments, the RF-based sensing messages may be broadcasted and the RF data messages may be unicasted. In yet other embodiments, RF-based sensing messages and RF data messages may be unicasted or broadcasted. Furthermore, in this embodiment, transmitting node 26 determines whether the RF messages 34 have been completely transmitted and furthermore broadcasts an information whether it completely transmitted the RF messages 34. This information may be included, for example, in a payload of a separate RF data message and/or at the end of the RF messages 34. The transmitting node 26 may optionally transmit a schedule to the receiving nodes, e.g., also via broadcasting it. The schedule may be included in the RF messages 34, e.g., as payload. Additionally, in this embodiment, the transmitting node 26 broadcasts the RF messages 34 using Zigbee and receives wireless noise 42 from its surrounding using WiFi while transmitting the RF messages 34 by broadcasting them.

In this embodiment, the CL system 100 adapts its transmission power based on the received wireless noise from its surroundings such that a certain SNR for the RF messages 34 is maintained. In other embodiments, the RF system may be configured for adapting a setting of any other communication technology parameter, e.g., its transmission frequency, or any other communication technology parameters of the transmitting node based on the received wireless noise from its surroundings, based on a received wireless noise of the one or more receiving nodes, or based on the received wireless noise from its surroundings and the received wireless noise of the one or more receiving nodes such that a certain SNR for the RF messages is maintained.

The RF messages 34 and the information whether the RF messages 34 have been completely transmitted are received by the receiving nodes 28 and 30. The receiving nodes 28 and 30 re-transmit the RF data messages 38, i.e., transmitting them between each other. This corresponds to a multi-hop broadcasting approach for the RF data messages 38 which allows to ensure a high delivery reliability. In contrast, the RF-based sensing messages 36 are not re-transmitted. This corresponds to a single-hop broadcasting approach. A node which did not receive the RF-based sensing messages 36 from the broadcast by the transmitting node 26 will not receive it at all. This allows to derive information from possible discrepancy of missed parts of the RF-based sensing messages 36 and missed parts of the RF data messages 38. In other embodiments, the RF messages may be unicasted or broadcasted and not re-transmitted or re-transmitted by unicasting or broadcasting them. Preferably, only the RF data messages are re-transmitted while the RF-based sensing messages are not re-transmitted.

In this embodiment, the receiving nodes 28 and 30 receive the RF messages 34 using Zigbee and additionally receive wireless noise 42 from their respective surrounding using WiFi while receiving the RF messages 34. The received wireless noise 42 is stored and may be used for improving processing of the received RF messages 34.

Nodes 28 and 30 of the CL system 100 determine whether at least part of the RF-based sensing messages 36, whether at least part of the RF data messages 38 or whether at least part of the RF-based sensing messages 36 and at least part of the RF data messages 38 are missing and which of the nodes missed them. The nodes 28 and 30 transmit this information to the node 26 which stores it into its memory for further processing. In other embodiments, the information may be stored on any other node or the external server.

Node 26 determines from the information received from the nodes 28 and 30 a discrepancy between missed parts of the RF-based sensing messages 36 and missed parts of the RF data messages 38. In this embodiment, a ratio between missed parts of the RF-based sensing messages 36 and missed parts of the RF data messages 38 is determined. Node 26 then determines whether missing at least part of the RF messages 34 is caused by an activity event of user 32 in transmission path 40 based on one or more RF system criteria.

In this embodiment, the RF system criteria include which of the nodes 28 or 30 missed at least part of the RF messages 34 and in particular, which type of RF messages 34, i.e., RF-based sensing messages 36 or RF data messages 38 was missed. Thus, the RF system criteria include whether only at least part of the RF-based sensing messages 36, whether only at least part of the RF data messages 38, or whether at least part of the RF-based sensing messages 36 and at least part of the RF data messages 38 are missing. Missing only part of the RF-based sensing messages 36 may indicate that the user 32 blocked the transmission path 40 (cf. FIG. 3) and missing of the part of the RF-based sensing messages 36 is caused by an activity event of the user 32. Additionally, the RF system criteria include the ratio between the missed parts of the RF-based sensing messages 36 and the missed parts of the RF data messages 38. In other embodiments, the RF system criteria may also include any other discrepancy between the missed parts of the RF-based sensing messages and the missed parts of the RF data messages.

Furthermore, the RF system criteria include the received wireless noise 42 of the transmitting node 26 while transmitting the RF messages 34 and the received wireless noise 42 of the receiving nodes 28 and 30 while receiving the RF messages 34. In other embodiments, the RF system criteria may also include only one of them, namely the received wireless noise of the transmitting node while transmitting the RF messages or the received wireless noise of the one or more receiving nodes while receiving the RF messages.

The RF system criteria may also include the different transmitting capabilities of the nodes, the different receiving capabilities of the nodes, the different processing capabilities of the nodes, or a combination thereof.

RF-based sensing is performed by the CL system 100 based on part of the RF messages 34 that was not missed at the one or more receiving nodes 28 and 30 and based on whether missing of at least part of the RF messages 34 is caused by an activity event of a tangible entity in the at least one transmission path between the transmitting node 26 and the receiving nodes 28 and 30. Therefore, a RF-based sensing analysis algorithm, in this embodiment, running on node 26 uses the information as input and outputs a detection result as output. This may allow improving RF-based sensing. In other embodiments, the RF-based sensing analysis algorithm may be run on any other node, on a server, or on an external server.

In other embodiments, the RF system may also be configured for receiving wireless noise at the nodes from their respective surroundings over a time period, and for determining respective noise baselines for the nodes based on the received wireless noise. The RF system criteria may, in this case, include the noise baseline of the transmitting node, the respective noise baselines of the one or more receiving nodes or the noise baseline of the transmitting node and the respective noise baselines of the one or more receiving nodes.

In other embodiments, a receiving node receives an information from a transmitting node that all RF-based sensing messages are transmitted by the transmitting node at, for example, +10 dBm. The receiving node receives the RF messages, for example, at −40 dBm. Instead of using this received signal strength as input to its RF-based sensing analysis algorithm, in this embodiment, the transmitting node uses its second communication technology to locally measure background noise just before, during, and/or after a transmission. The transmitting node determines a background noise level to be, for example, at −80 dBm. A receiver sensitivity of a radio used for measuring the background noise may be, for example, −100 dBm such that the transmitting node determines a 20 dB (100 dBm−80 dBm) contribution of background noise. This information may then be provided to the receiving node for improving processing of the RF messages. A RF-based sensing analysis algorithm running on the receiving node may be based on the information of the background noise level apply correction factors or interpolate values differently. For instance, it may apply a penalization of −3 dB for each RSSI whenever a concurrent noise value exceeds 15 dBm. Since the background noise is in this example 20 dBm, the actual RSSI used by the RF-based sensing analysis algorithm is −43 dBm instead of the −40 dBm measured by the receiving RF node. If the background noise is at, for example, −8 dBm, the penalization is not applied in that case and the raw RSSI measurement of −40 dBm may be used.

In yet other embodiments, the RF system may be configured for determining whether a number of missed RF-based sensing messages per minute exhibit some repeatable pattern. For example, the following table shows a rate of missed RF-sensing based messages to totally transmitted RF messages between a specific transmitting node and a specific receiving node, e.g., node 26 and node 28.

TABLE 1

| time window | missed RF message rate |
|---|---|
| 1 | 10% |
| 2 | 20% |
| 3 | 50% |
| 4 | 20% |
| 5 | 10% |
| 6 | 20% |
| 7 | 50% |
| 8 | 20% |
| 9 | 10% |

The rate of missed RF-sensing based messages may be determined, for example, by determining which RF messages were completely transmitted and determining an amount of RF messages missed by the specific receiving node and dividing the latter by the former. Alternatively, a ratio or difference between RF-based sensing messages and RF data messages may be determined. Table 1 shows a repeating time-pattern indicating a regular reocurring recurrence of the disturbance. Such disturbance is most likely caused by some scheduled wireless interference, such as a microwave oven or WiFi streaming activated at certain time periods, i.e., a reocurring wireless interference. It is less likely that people cross the sensing space at the same location repetitively as human activities tend to be less repetitive over time. Therefore, the RF system may additionally or alternatively to taking into account a discrepancy between the RF-based sensing messages and the RF data messages, take into account patterns associated with wireless interference, such as reocurring wireless interference, e.g., a congested spectrum in the evening for an apartment in dense urban area. The reocurring wireless interference may be included, for example, in the RF system criteria.

Figure 4:
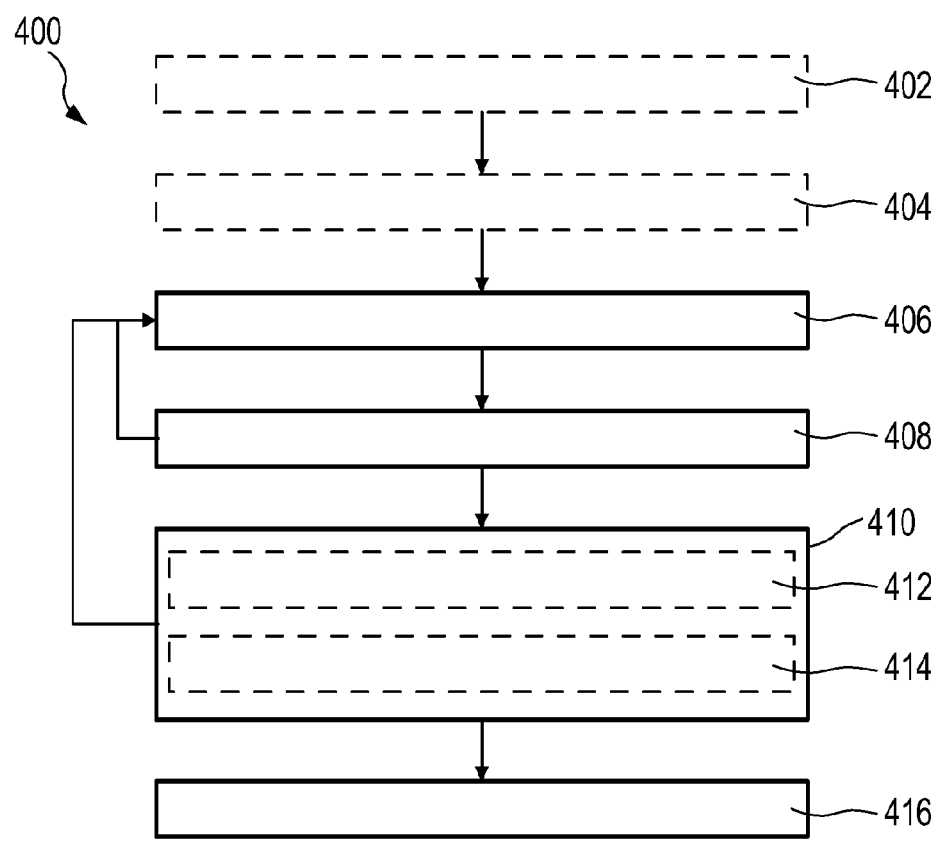
FIG. 4 shows an embodiment of the method for operating an RF system by determining whether missing of at least part of RF messages was caused by an activity event of a tangible entity in at least one transmission path.

FIG. 4 shows an embodiment of the method for operating an RF system comprising multiple nodes configured for transmitting and receiving RF messages, e.g., the CL system 100 disclosed in FIGS. 2 and 3. In other embodiments, nodes may also be configured solely for transmitting RF messages or solely for receiving RF messages.

In step 402, RF messages are transmitted from a transmitting node. The RF messages include RF-based sensing messages and RF data messages. The RF-based sensing messages are used for performing RF-based sensing in order to detect activity events of tangible entities in the sensing space. The RF data messages are used for data exchange, e.g., maintaining a network infrastructure and exchanging control signals. Step 402 is optional.

In step 404, it is determined by the transmitting node whether the RF messages were completely transmitted. Step 404 is optional. In other embodiments, another component of the RF system may be configured for determining whether the RF messages were completely transmitted. Optionally, the transmitting node additionally transmits an information that the RF messages were completely transmitted.

In step 406, the RF messages transmitted by the transmitting node are received at two receiving nodes. In other embodiments, the RF messages may also be received by more receiving nodes, e.g., three, ten, or any other number of receiving nodes arranged in a sensing space.

In step 408, it is determined by the two receiving nodes whether the RF messages were completely received by them. In other embodiments, another component of the RF system may be configured for determining whether the RF messages were completely received. In order to determine whether the RF messages were completely received, in this embodiment, a checksum of the RF messages is checked. In other embodiments, other methods may be used to determine whether the RF messages were completely received. If it is determined that at least part of the RF messages are missing at one of or both receiving nodes, step 410 is performed. Else step 406 is repeated.

Steps 406 and 408 may also be performed in parallel, e.g., while the transceiver of the receiving node receives new RF messages, previous RF messages may be processed in the processor of the receiving unit.

In step 410, upon missing at least part of the RF messages at one of or both receiving nodes, it is determined whether missing of at least part of the RF messages is caused by an activity event of a tangible entity in at least one transmission path between the transmitting node and the two receiving nodes based on one or more RF system criteria. Step 416 is performed if it is determined that missing of at least part of the RF messages is caused by an activity event of a tangible entity in at least one transmission path between the transmitting node and the two receiving nodes. Else, step 406 and step 408 are repeated.

Step 410 includes optional substeps 412 and 414.

In substep 412 it is determined whether at least part of the RF-based sensing messages, whether at least part of the RF data messages, or whether at least part of the RF-based sensing messages and at least part of the RF data messages are missing.

In substep 414, a discrepancy between missed parts of RF-based sensing messages and missed parts of RF data messages is determined. In this embodiment, the discrepancy corresponds to a ratio. In other embodiments, it may be any other kind of discrepancy, such as a difference.

The RF system criteria in this embodiment include one or more of
- whether only at least part of the RF-based sensing messages, whether only at least part of the RF data messages, or whether at least part of the RF-based sensing messages and at least part of the RF data messages are missing,
- the ratio between the missed parts of the RF-based sensing messages and the missed parts of the RF data messages.
- different transmitting capabilities of the nodes, different receiving capabilities of the nodes, different processing capabilities of the nodes or the combination thereof, and
- which of the nodes missed at least part of the RF messages.

In step 416, the CL system determines which activity event caused missing of the RF-messages, e.g., a user walking in the sensing space and responds accordingly, e.g., by activating luminaires of the CL system for providing lighting, by providing information about the detected activity event, by triggering another system, such as an alarm system, or the like.

In other embodiments, the RF messages may be broadcasted by the transmitting node. The RF data messages may be re-transmitted by the one or more receiving nodes while the RF-based sensing messages are not re-transmitted.

In other embodiments, RF-based sensing may be performed based on part of the RF messages that was not missed at the one or more receiving nodes and based on whether missing of at least part of the RF messages is caused by an activity event of a tangible entity in the at least one transmission path between the transmitting node and the one or more receiving nodes.

Wireless noise may be received at the nodes from their respective surroundings over a time period. Based on the wireless noise, respective noise baselines may be determined for the nodes. In this case, the RF system criteria may include the noise baseline of the transmitting node, the respective noise baselines of the one or more receiving nodes, or the noise baseline of the transmitting node and the respective noise baselines of the one or more receiving nodes.

When a transmitting node includes two different communication technologies, the RF messages may be transmitted based on one of the communication technologies by the transmitting node while it receives wireless noise from its surroundings based on the other communication technology. A noise baseline may be determined and transmitted to another node.

When a receiving node includes two different communication technologies, RF messages may be received based on one of the communication technologies by the receiving node and while it receives the RF messages, additionally wireless noise may be received from its surroundings. This may improve to determine what caused missing of at least part of the RF messages.

When at least two of the nodes include two different communication technologies, RF messages may be transmitted based on one of the communication technologies by a transmitting node, the RF messages may be received based on the same communication technology by a receiving node and wireless noise from their respective surroundings may be received by the transmitting node and the receiving node based on the other communication technology while transmitting or respectively receiving the RF messages. In this case, the RF system criteria may include the received wireless noise of the transmitting node while transmitting the RF messages, the received wireless noise of the receiving node while receiving the RF messages, or the received wireless noise of the transmitting node and the received wireless noise of the receiving node while transmitting or respectively, receiving the RF messages.

In one embodiment, settings of communication technology parameters of the transmitting node may be adapted based on the received wireless noise from its surroundings, based on the received wireless noise of the one or more receiving nodes, or based on the received wireless noise from its surroundings and the received wireless noise of the one or more receiving nodes such that a certain signal-to-noise ratio for the RF messages is maintained. The adapted communication technology parameters may be, for example, transmission power, transmission frequency, or repetition frequency.

While the invention has been illustrated and described in detail in the drawings and foregoing description, such illustration and description are to be considered illustrative or exemplary and not restrictive; the invention is not limited to the disclosed embodiments. For example, it is possible to operate the invention in a smart home system, a BMS, or in any other RF system in which RF messages may be missed. This may allow improving performance of the RF system since the RF system may determine what caused missing the RF messages and respond accordingly. RF systems may have preferred operational configuration, e.g., depending on their application, for example, a sensing application. For example, an RF system may be used for performing RF-based sensing including five nodes transmitting RF messages each every 200 ms. This allows a fast and reliable response of an RF-based sensing algorithm for detecting, for example, an activity event in form of a motion of a user. The RF messages are not received exactly every 200 ms but may be spread+/−100 ms due to CCA backoff times, the operational state of the nodes or other causes. For activating lighting based on detection of an activity event in form of motion by RF-based sensing, an end-to-end latency of 500 ms is desired. Alternatively, home monitoring may be performed with a latency of 10 s or vacancy-lighting-control allowing a higher latency than motion-controlled activation of lighting.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like receiving RF messages transmitted by a transmitting node at one or more receiving nodes, determining whether the RF messages were completely received by the one or more receiving nodes, upon missing at least part of the RF messages at the one or more receiving nodes, determining whether missing of at least part of the RF messages is caused by an activity event of a tangible entity in at least one transmission path between the transmitting node and the one or more receiving nodes based on one or more RF system criteria, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to operating an RF system comprising multiple nodes for transmitting and receiving RF messages. RF messages transmitted by a transmitting node are received at one or more receiving nodes. It is determined whether the RF messages were completely received. Upon missing at least part of the RF messages at the receiving nodes, it is determined whether missing of at least part of the RF messages is caused by an activity event of a tangible entity in transmission paths between the transmitting node and the receiving nodes based on one or more RF system criteria. The RF messages may include RF-based sensing messages for performing RF-based sensing and RF data messages for data exchange. A discrepancy between missed parts of the RF-based sensing messages and missed parts of the RF data messages may be determined and included in the RF system criteria.

The invention claimed is:

1. A radio frequency system for performing RF-based sensing in order to detect sensing events, the system comprising multiple nodes configured for transmitting and/or receiving radio frequency messages, wherein the radio frequency messages include radio frequency based sensing messages and radio frequency data messages, and the radio frequency system configured for:

determining that at least part of the radio frequency sensing messages and/or at least part of the radio frequency data messages transmitted by a transmitting node of the radio frequency system were not received by one or more receiving nodes of the radio frequency system and determining whether missing of at least part of the radio frequency messages is caused by movement of an object, animal or person in at least one transmission path between the transmitting node and the one or more receiving nodes based on one or more radio frequency system criteria, wherein the one or more radio frequency system criteria comprise at least one of:

whether only at least part of the radio frequency based sensing messages, whether only at least part of the radio frequency data messages, or whether both at least part of the radio frequency based sensing messages and at least part of the radio frequency data messages are missing; and a discrepancy between missed parts of the radio frequency based sensing messages and missed parts of the radio frequency data messages, wherein the discrepancy comprises a difference of an amount of missed parts of RF-based sensing messages and an amount of missed parts of RF data messages, or a ratio of the amount of the missed parts of the RF-based sensing messages and the amount of the missed parts of the RF data messages.

2. The radio frequency system according to claim 1, wherein the transmitting node is configured for broadcasting the radio frequency messages, and wherein the one or more receiving nodes are configured for re-transmitting the radio frequency data messages and for not re-transmitting the radio frequency based sensing messages.

3. The radio frequency system according to claim 1, wherein at least two nodes of the radio frequency system have different transmitting capabilities, different receiving capabilities, different processing capabilities, or a combination thereof, and wherein the radio frequency system criteria further include the different transmitting capabilities of the nodes, the different receiving capabilities of the nodes, the different processing capabilities of the nodes, or the combination thereof.

4. The radio frequency system according to claim 1, wherein the radio frequency system is configured for performing radio frequency based sensing based on part of the radio frequency messages that was not missed at the one or more receiving nodes and based on whether missing of at least part of the radio frequency messages is caused by the movement of the object, animal or person in the at least one transmission path between the transmitting node and the one or more receiving nodes.

5. The radio frequency system according to claim 1, wherein the radio frequency system is configured for:

receiving wireless noise at the nodes from their respective surroundings over a time period, and determining respective noise baselines for the nodes based on the received wireless noise, and wherein the radio frequency system criteria include the noise baseline of the transmitting node, the respective noise baselines of the one or more receiving nodes, or the noise baseline of the transmitting node and the respective noise baselines of the one or more receiving nodes.

6. The radio frequency system according to claim 1, wherein at least one of the nodes includes two different communication technologies and wherein the at least one of the nodes is configured for transmitting and/or receiving radio frequency messages based on one of the communication technologies and for receiving wireless noise from its surroundings based on the other communication technology while transmitting or receiving the radio frequency messages.

7. The radio frequency system according to claim 6, wherein the radio frequency system criteria include the received wireless noise of the transmitting node while transmitting the radio frequency messages, the received wireless noise of the one or more receiving nodes while receiving the radio frequency messages, or the received wireless noise of the transmitting node and the received wireless noise of the one or more receiving nodes while transmitting or receiving the radio frequency messages.

8. The radio frequency system according to claim 6, wherein the radio frequency system is configured for adapting a setting of communication technology parameters of the transmitting node based on the received wireless noise from its surroundings, based on the received wireless noise of the one or more receiving nodes, or based on the received wireless noise from its surroundings and the received wireless noise of the one or more receiving nodes such that a certain signal-to-noise ratio for the radio frequency messages is maintained.

9. The radio frequency system according to claim 1, wherein the radio frequency system criteria include which of the nodes missed at least part of the radio frequency messages.

10. A method for operating a radio frequency system for performing RF-based sensing in order to detect sensing events, the system comprising multiple nodes configured for transmitting and/or receiving radio frequency messages, wherein the radio frequency messages include radio frequency based sensing messages and radio frequency data messages, the method comprising the steps:
receiving radio frequency messages transmitted by a transmitting node at one or more receiving nodes,
determining that at least part of the radio frequency sensing messages and/or at least part of the radio frequency data messages were not received by the one or more receiving nodes, and
determining whether missing of at least part of the radio frequency messages is caused by a movement of an object, animal or person in at least one transmission path between the transmitting node and the one or more receiving nodes based on one or more radio frequency system criteria, wherein the one or more radio frequency system criteria comprise at least one of:
whether only at least part of the radio frequency based sensing messages, whether only at least part of the radio frequency data messages, or whether both at least part of the radio frequency based sensing messages and at least part of the radio frequency data messages are missing; and
a discrepancy between missed parts of the radio frequency based sensing messages and missed parts of the radio frequency data messages, wherein the discrepancy comprises a difference of an amount of missed parts of RF-based sensing messages and an amount of missed parts of RF data messages, or a ratio of the amount of the missed parts of the RF-based sensing messages and the amount of the missed parts of the RF data messages.

11. A non-transitory computer readable medium comprising computer program code to perform the method of claim 10, when the computer program code is run on one or more processors.

* * * * *